US010556598B2

(12) United States Patent
Petrak et al.

(10) Patent No.: US 10,556,598 B2
(45) Date of Patent: Feb. 11, 2020

(54) VEHICLE CONTROL SYSTEMS AND METHODS

(71) Applicant: General Electric Company, Schenectady, NY (US)

(72) Inventors: Edward Thomas Petrak, Erie, PA (US); Henry Young, Erie, PA (US); Jason Daniel Kuttenkuler, Erie, PA (US); Jeffrey John Wolff, Erie, PA (US)

(73) Assignee: GE GLOBAL SOURCING LLC, Norwwalk, CT (US)

( * ) Notice: Subject to any disclaimer, the term of this patent is extended or adjusted under 35 U.S.C. 154(b) by 215 days.

(21) Appl. No.: 15/359,909

(22) Filed: Nov. 23, 2016

(65) Prior Publication Data

US 2018/0141565 A1    May 24, 2018

(51) Int. Cl.
 *B60W 50/02* (2012.01)
 *B60W 50/038* (2012.01)
 (Continued)

(52) U.S. Cl.
 CPC .... *B60W 50/0205* (2013.01); *B60W 50/0225* (2013.01); *B60W 50/038* (2013.01);
 (Continued)

(58) Field of Classification Search
 CPC ...... G07C 5/008; G07C 5/0808; G07C 5/006; G07C 5/0825; G07C 5/0816; G07C 5/085;
 (Continued)

(56) References Cited

U.S. PATENT DOCUMENTS

| 5,210,704 A | 5/1993 | Husseiny |
| 5,852,793 A | 12/1998 | Board et al. |

(Continued)

FOREIGN PATENT DOCUMENTS

| CN | 103616179 A | 3/2014 |
| DE | 102 57 793 A1 | 7/2004 |

(Continued)

OTHER PUBLICATIONS

Wei, D., "Research on the Model of Overhaul Cycle of Diesel Locomotives Based on Stress Damage," IEEE Vehicle Power and Propulsion Conference (VPPC), Harbin, China, pp. 1-4 (Sep. 3-5, 2008).

(Continued)

*Primary Examiner* — Jeffrey C Boomer
(74) *Attorney, Agent, or Firm* — Christopher R. Carroll; The Small Patent Law Group, LLC

(57) ABSTRACT

Aspects of the subject technology relate to systems and methods for monitoring component wear to prevent premature component failure. A control system for a system having one or more mechanical or electronic components may include a life manager that monitors accumulated wear of the one or more components. The life manager may provide an alert and/or limit system operations when the accumulated wear exceeds a limit. The limit may be dynamically determined based on an operating age of the component. The limit may also be defined as a matrix of limits, each defined for a range of a particular operating condition of the component. Operating conditions may include an applied torque range for a vehicle wheel or a thermal cycle temperature range for an electronic switching component.

19 Claims, 5 Drawing Sheets

(51) Int. Cl.
 *B60W 50/14* (2012.01)
 *G07C 5/08* (2006.01)
 *G07C 5/00* (2006.01)

(52) U.S. Cl.
 CPC ........... *B60W 50/14* (2013.01); *G07C 5/0816* (2013.01); *G07C 5/0825* (2013.01); *G07C 5/008* (2013.01); *G07C 5/085* (2013.01)

(58) Field of Classification Search
 CPC ...... G06Q 10/20; G06Q 30/012; G08G 1/166; B60W 30/09; B60W 50/14; B60W 50/02; B60W 50/0205; B60W 50/038; B60W 50/0225
 USPC .............. 701/29.1, 29.3, 31.4; 703/8; 705/4; 340/438; 1/1; 318/494
 See application file for complete search history.

(56) References Cited

U.S. PATENT DOCUMENTS

| | | | |
|---|---|---|---|
| 6,366,199 B1* | 4/2002 | Osborn | B60H 1/00585 340/438 |
| 6,542,853 B1 | 4/2003 | Murakami et al. | |
| 7,283,932 B2 | 10/2007 | Olsson | |
| 8,116,990 B2 | 2/2012 | Koul | |
| 8,600,611 B2 | 12/2013 | Seize | |
| 8,714,661 B2 | 5/2014 | Vallejo | |
| 8,988,016 B2 | 3/2015 | Daigle et al. | |
| 2005/0143956 A1 | 6/2005 | Long | |
| 2009/0099886 A1 | 4/2009 | Greiner et al. | |
| 2010/0017236 A1* | 1/2010 | Duddle | G06Q 40/08 705/4 |
| 2010/0060223 A1* | 3/2010 | Sakai | H02K 1/2766 318/494 |
| 2011/0106510 A1 | 5/2011 | Poon | |
| 2013/0013138 A1 | 1/2013 | Lu et al. | |
| 2013/0262067 A1* | 10/2013 | Zhang | G01R 31/3651 703/8 |
| 2014/0046614 A1 | 2/2014 | Pettersson | |
| 2014/0074345 A1* | 3/2014 | Gabay | G07C 5/008 701/31.4 |
| 2016/0093119 A1* | 3/2016 | Ahn | G07C 5/006 701/29.3 |
| 2016/0163130 A1* | 6/2016 | Zagajac | G07C 5/0808 701/29.1 |
| 2016/0318445 A1* | 11/2016 | Sugimoto | B60Q 9/008 |
| 2017/0178498 A1* | 6/2017 | Mcerlean | B60K 35/00 |
| 2017/0221069 A1* | 8/2017 | Remboski | G07C 5/0825 |

FOREIGN PATENT DOCUMENTS

| | | |
|---|---|---|
| EP | 1 508 880 A2 | 2/2005 |
| JP | 2002-092137 A | 3/2002 |

OTHER PUBLICATIONS

International Search Report and Written Opinion issued in connection with related PCT Application No. PCT/US2015/065874 dated Mar. 29, 2016.

* cited by examiner

VEHICLE CONTROL SYSTEMS AND METHODS

TECHNICAL FIELD

The present description relates generally to component wear, and more particularly, but not exclusively, to systems and methods for preventing premature component failure.

BACKGROUND

Mechanical and electronic components such as vehicle components often have a limited design life. Design life analyses and calculations that are used to determine a design lifetime for a component often include expectations or assumptions that the component will be used with a specific design duty cycle. Operating a component outside the rated application associated with the design duty cycle may reduce overall life expectancy for the component and can cause premature failure of the component, prior to the expiration of the design lifetime. Premature failure of a component can be costly and inefficient, or even dangerous if, for example, a system component fails unexpectedly during operation of a system that depends on that component.

BRIEF DESCRIPTION

Systems and methods are disclosed herein that prevent or reduce premature component failure for mechanical and electronic components.

In some aspects, the disclosed subject matter relates to a vehicle. The vehicle may include a vehicle control system having processor circuitry, a system memory, and a system communications interface. The vehicle may include a vehicle component. The vehicle component may have a component memory and a component communications interface that is communicatively coupled with the system communications interface. The component memory may be configured to store an accumulated wear parameter value for the vehicle component and an operating age that is indicative of a duration of use of the vehicle component. The system memory may store instructions that, when executed by the processor circuitry of the vehicle control system, cause the vehicle control system to: obtain the accumulated wear parameter value and the operating age from the component memory of the vehicle component; update, during operation of the vehicle component, the accumulated wear parameter value; advance the operating age during operation of the vehicle component; determine, during operation of the vehicle component, an available wear parameter value for the vehicle component based on the accumulated wear parameter value and the operating age; and perform a first corrective action for the vehicle based on at least the available wear parameter.

In other aspects, a vehicle control system is provided. The vehicle control system may include processor circuitry and a system memory. The system memory may store instructions that, when executed by the processor circuitry, cause the processor circuitry to: obtain a plurality of accumulated wear parameter values for a plurality of operating ranges, respectively, for a vehicle component of a vehicle and an operating age that is indicative of a duration of use of the vehicle component; monitor an operating condition of the vehicle component over the plurality of operating ranges; update the plurality of accumulated wear parameter values for the plurality of operating ranges, respectively, based on the monitored operating condition; advance the operating age based on operation of the vehicle component; determine an available wear parameter value for the vehicle component for each of the plurality of operating ranges based on the plurality of accumulated wear parameter values and the operating age of the vehicle component; and perform a corrective action for the vehicle when the available wear parameter value for at least one of the operating ranges falls below a respective threshold.

In other aspects, the disclosed subject matter also relates to a computer-implemented method. The method may include: obtaining an accumulated wear parameter value for a vehicle component of a vehicle and an operating age that is indicative of a duration of use of vehicle component; updating the accumulated wear parameter value based on operation of the vehicle component; advancing the operating age based on operation of the vehicle component; determining an available wear parameter value for the vehicle component based on the accumulated wear parameter value and the operating age; and performing a first corrective action for the vehicle when the available wear parameter value falls below a first threshold.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several aspects of the subject technology are set forth in the following figures.

DETAILED DESCRIPTION

Figure 1:
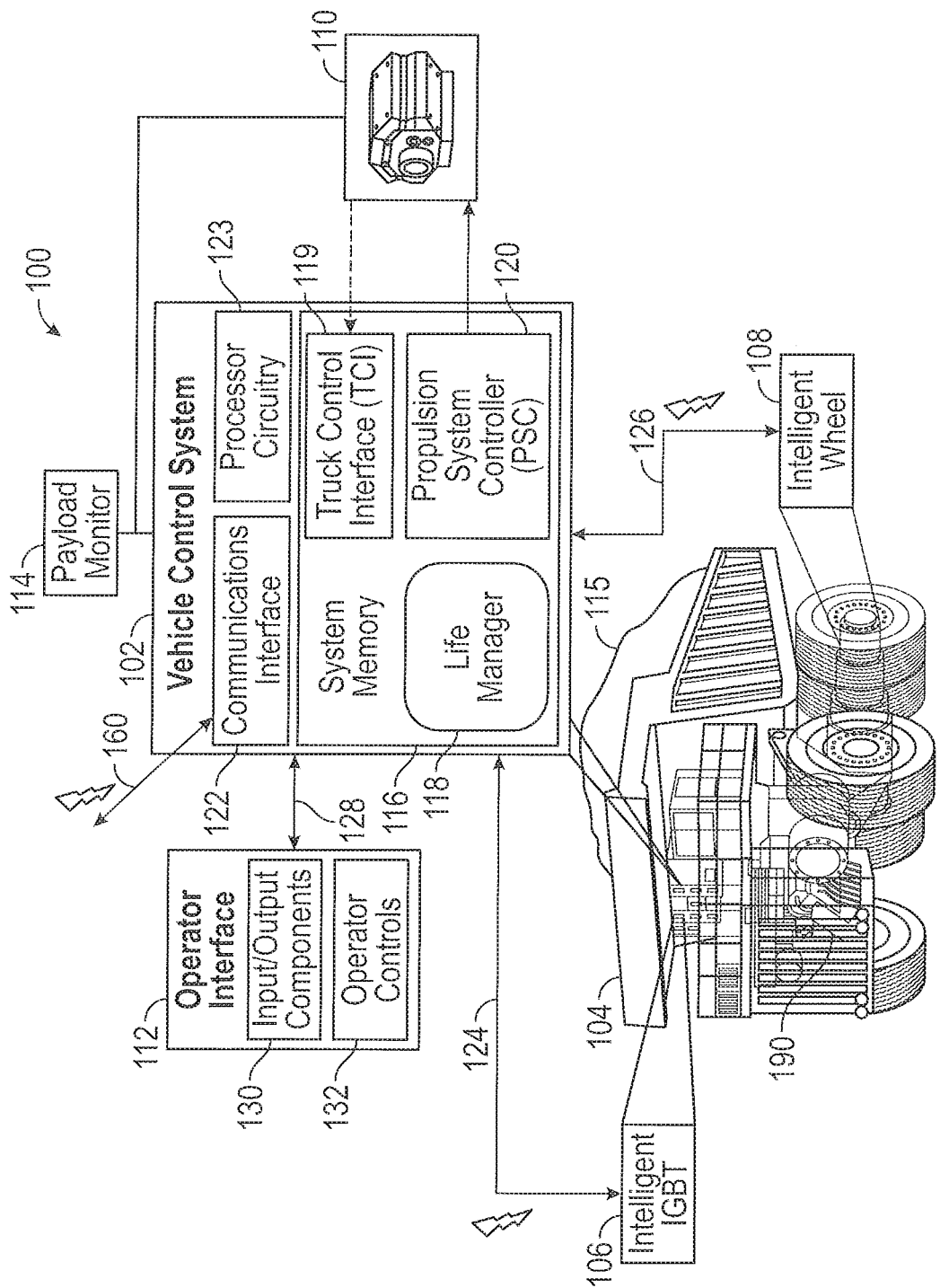
FIG. 1 illustrates an example system in accordance with various aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject disclosure provides component wear management systems and methods for various systems including, but not limited to, vehicles (e.g., trucks, off-highway vehicles, automobiles, airplanes, ships, helicopters, or the like), computing systems, heating ventilation and air conditioning (HVAC) systems, refrigeration systems, pumping systems, drilling systems, or other systems and/or machines that have mechanical and/or electrical components that can wear or fail over time and/or have a specified design lifetime.

In various aspects, as described in further detail hereinafter, each component may include onboard memory (sometimes referred to herein as component memory) that stores one or more accumulated wear parameter values that indicate the accumulated wear of that component. The component memory may also store an operating age for the component that indicates a duration of use of the component. A life manager integrated with the component or implemented as part of a control system in communication with the component may utilize and maintain the accumulated wear parameter values in the onboard memory of the component. For example, the life manager may determine, using the operating age of the component and a component(s) designed wear growth rate, a projected expected wear parameter value. The accumulated wear parameter value may be subtracted from the projected wear parameter value to determine an available wear parameter value. If the accumulated wear parameter value is greater than the projected available wear parameter value, the available wear parameter value may indicate overuse of the component at the current operating age. If the accumulated wear parameter value is less than the projected available wear parameter value, the available wear parameter value may indicate an amount of usage of the component that has been banked for use at the current operating age. If the amount of usage of the component that has been banked for use at the current operating age exceeds an upper threshold, the banked amount may indicate underuse of the component at the current operating age.

In some implementations, a component may be a cyclic component such as a rotating or oscillating mechanical component and/or thermally cycling electronic or mechanical component. In implementations in which a component is a cyclic component, an accumulated wear parameter value may be an accumulated cycle count for the cyclic component. In implementations in which a component is a cyclic component, a projected wear parameter value may be a projected cycle count for the cyclic component at the current operating age. In implementations in which a component is a cyclic component, an available wear parameter value may be an available cycle count for the cyclic component at the current operating age.

Examples of cyclic mechanical components include, but are not limited to, wheels, gears, bearings, motor or generator rotors, drilling structures, pistons, turbines, or the like. Examples of cyclic electrical components include, but are not limited to, insulated gate bipolar transistors (IGBTs), fuses, rechargeable batteries, central processing units, or the like.

However, it should be understood that life management systems and methods disclosed herein may also be applied to non-cyclic components that wear or weaken over time such as fuses, brake pads, fluid and/or gas sealing structures, mechanical support structures such as bridge structures, airplane wings, beams, vehicle frames, girders, bulkheads, fasteners, or any other components for which a measurable wear parameter can be identified and monitored.

In accordance with some aspects of the disclosure, one or more accumulated wear parameter values and an operating age may be stored at the component itself. In this way, the component can be removed from a larger system such as a vehicle and moved to another system such as another vehicle, while still maintaining continuity of tracking of the component wear parameter values.

In one suitable implementation that is sometimes discussed herein as an example, wear of one or more vehicle components for a vehicle such as an off highway vehicle (OHV) (e.g., an OHV truck) may be monitored and controlled. A vehicle component may be, for example, a wheel, a gear, an electronic switching device such as an insulated-gate bipolar transistor (IGBT) or other transistor or electronic component, a battery, a brake pad, a piston, a tire, or other mechanical components.

In some implementations, accumulated wear parameter values may include accumulated cycle counts for cyclic components such as wheel revolutions for a wheel or thermal cycles for an IGBT. For instance, an intelligent wheel may store its operating age (e.g., an indication of a duration of use such as an accumulated amount of time during which the wheel has been operated at an operational speed) and an accumulated number of wheel revolutions. In some implementations, the accumulated wheel revolutions may be stored (e.g., binned) according to operating conditions under which the revolutions occurred such as various torque levels that were applied to the wheel during operation.

As another example, an intelligent IGBT may store its operating age (e.g., an indication of a duration of use such as an accumulated amount of time during which the IGBT has been operated at an operating current level) and an accumulated number of thermal cycles. In some implementations, the accumulated thermal cycles may be stored (e.g., binned) in accordance with operating conditions under which the thermal cycles occurred such as various temperature excursion ranges.

As will be better understood in light of the additional disclosure below, the systems and methods of the subject technology may help mitigate premature component failures by proactively reacting to and/or notifying an operator of out-of-range operation of the components. In this way, the subject technology may help maximize actual life correspondence with design life expectations, a system operator may be assisted in complying with rated component operation, and/or corrective actions may be induced in the event of, or to prevent, prolonged out-of-range operation.

FIG. 1 shows an exemplary system for life management (sometimes referred to as wear management) of one or more components. In the example of FIG. 1, system 100 includes a vehicle 104 having a vehicle control system 102 and, communicatively coupled to vehicle control system 102, an operator interface 112, a payload monitor 114, a propulsion system 110, and intelligent components including intelligent IGBT 106, intelligent wheel 108, and/or intelligent alternator 190.

As used herein, an "intelligent" component may be a component having at least an onboard component memory and a communications interface, but may also include a component having processor circuitry and/or one or more sensors.

Vehicle control system 102 may control various aspects of the operation of vehicle 104, including life management operations for one or more intelligent components. Vehicle control system 102 may include system memory 116, processor circuitry 123, and system communications interface 122. System memory 116 may include, for example, read-only memory (ROM), random access memory (RAM), volatile or non-volatile memory, magnetic or optical storage, permanent or removable storage and/or other non-transitory storage media configure to store static data, dynamic data, and/or computer readable instructions for processor circuitry 123.

For example, system memory 116 may include instructions for processing, generating, and/or providing life manager operations of life manager 118, truck control interface (TCI) operations for TCI 119, propulsion system controller (PSC) operations for PSC 120, and/or other vehicle operations and control instructions. In accordance with some implementations, processor circuitry 123 may retrieve instructions from system memory 116 to execute the processes of some implementations as described herein.

Processor circuitry 123 may include one or more microprocessors or multi-core processors, one or more application specific integrated circuits (ASICs) or field programmable gate arrays (FPGAs) that execute sequences of instructions or code, as examples. TCI 119 and PSC 120 may, in combination, interface with a mechanical prime mover 110 (e.g., one or more motors or engines driving an alternator) to provide electrical energy for control and movement of vehicle 104 (e.g., by converting electric energy and providing torque to the wheels of truck 104 as directed by the vehicle control system which may incorporate a traction control system).

Life manager 118 may communicate with one or more components such as intelligent components 106 and 108 of vehicle 104. In the example of FIG. 1, component 106 is an electronic component implemented as an intelligent switching component (e.g., an intelligent IGBT gate driver) and component 108 is a mechanical component implemented as an intelligent wheel. Although not explicitly shown in the example of FIG. 1, the vehicle alternator may also be an intelligent component. As indicated by arrows 124 and 126, intelligent components 106 and 108 may be in communication with life manager 118. More particularly, vehicle control system 102 may include system communications interface 122 communicatively coupled (e.g., wirelessly or via a wired connection) to intelligent components 106 and 108. Life manager 118 may read and/or write data from/to component memories respectively of intelligent components 106 and 108 (e.g., during operation of the components, periodically during or after operation of the components, or responsive to an event such as the end of a haul for vehicle 104). Arrows 124 and 126 may indicate, for example, Bluetooth® wireless communications, wireless communications based on other short range wireless communications protocols, or wired communications such as fiber-optic communications (as examples).

In accordance with various aspects, life manager 118 may be implemented as a separate module from system memory 116 or may be implemented as a software module stored in system memory 116 as shown in FIG. 1. Although life manager 118 is shown as a portion of vehicle control system 102 in the example of FIG. 1, this is merely illustrative. In other implementations, life manager 118 may be implemented partially or completely on intelligent components 106 and 108 themselves or on a remote system coupled to vehicle control system 102 via communications link 160.

Operator interface 112 may be communicatively and/or mechanically coupled to vehicle control system 102 as indicated by arrows 128. Operator interface 112 may include operator controls 132 for controlling the motion of vehicle 104 and/or other input/output components 130 for facilitating operator interaction with vehicle 104. Input/output components 130 of operator interface 112 may include displays, indicator lights, audio components or other output components. The output components may be operated in accordance with instructions provided by life manager 118 to generate, for an operator of vehicle 104, alerts when one or more accumulated wear parameter values of one or more components such as intelligent components 106 and 108 violate a threshold as will be described in further detail hereinafter.

Payload monitor 114 may be provided to monitor payload 115 and provide feedback to vehicle control system 102, in accordance with various aspects. For example, payload monitor 114 may be used to identify a payload dump that indicates the end of a haul cycle for vehicle 104.

System communications interface 122 may be communicatively coupled to one or more external systems (e.g., a third party dispatch system or a central control and/or monitoring system) via a direct, satellite-linked or other communications link 160.

In the example of FIG. 1, two intelligent components 106 and 108 are shown that can be monitored and/or managed by life manager 118. However, this is merely illustrative and it should be appreciated that life manager 118 may be operable to monitor and/or manage any number of electrical or mechanical components of vehicle 104.

Figure 2:
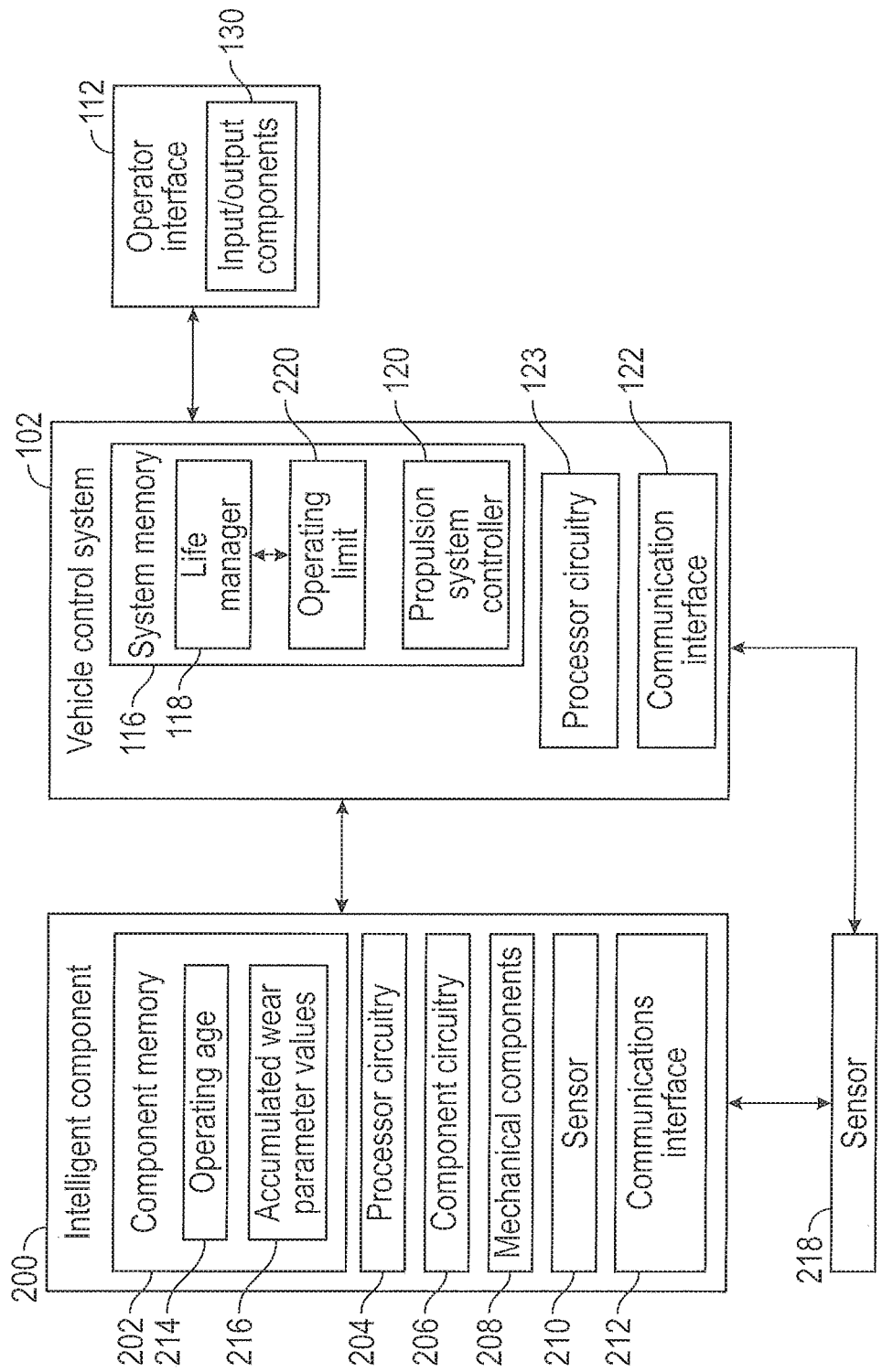
FIG. 2 illustrates an example of various components of a system in accordance with various aspects of the subject technology.

Exemplary details of an intelligent component 200 that may be monitored and/or managed by life manager 118 are shown in FIG. 2, in accordance with various aspects. As shown in FIG. 2, an intelligent component 200 (which, for example, may be an implementation of one of intelligent IGBT 106 or intelligent wheel 108 of FIG. 1) may include one or more of component memory 202, processor circuitry 204, component circuitry 206, mechanical components 208, one or more sensors such as sensor 210, and/or component communications interface 212 in various implementations. For substantially mechanical intelligent components (e.g., an intelligent wheel 108), intelligent component 200 may be provided without component circuitry 206 that is dedicated to the operation of the component itself. For substantially electronic intelligent components (e.g., an intelligent IGBT 106) intelligent component 200 may be provided without mechanical components 208 that are dedicated to the operation of the component itself.

Component memory 202 may store an operating age 214 and one or more accumulated wear parameter values 216. Accumulated wear parameter values 216 may include an accumulated cycle history, when, for example, intelligent component 200 is implemented as a cyclic component such as an IGBT or a wheel. In some implementations, accumulated wear parameter values 216 may be binned values that are binned by respective operating ranges (e.g., thermal cycle ranges or torque ranges in some implementations). In still other implementations, accumulated wear parameter values may include a thickness of a physical indicator such as a wear plate, the thickness of which may be tracked over time relative to a known correlation function of plate wear to overall component (e.g., wheel) life. In still other implementations, gear backlash (e.g., slack) may be measured by counting rotor revolutions with a parking brake set and tracked periodically, as monitored with respect to a known gearing-backlash-to-life function.

As shown in FIG. 2, one or more additional sensors such as sensor 218 that are separate from intelligent component 200 may be provided that measure a temperature, a revolution, an acceleration (e.g., a g-force impact) or other operating aspects of intelligent component 200. In some implementations, sensor 218 may be provided and intelligent component 200 may be provided without sensor 210. In some implementations, sensor 218 and sensor 210 may both be provided. In some implementations, sensor 210 may be provided without sensor 218. Further, in some implementations, intelligent component 200 may be provided without a sensor. In implementations in which no sensor is provided with an intelligent component, processor circuitry 123 and/or processor circuitry 204 may determine the operating conditions in which component 200 is operated based on a predetermined model such as a thermal model or a fatigue model for tracking of component wear. For example, the temperature of an intelligent IGBT may be determined based on a thermal model that provides a temperature based on other known operating properties of the IGBT such as a switching frequency or rate. The temperature determined based on the model may be used in detecting a thermal cycle and/or determining a temperature range of the thermal cycle. In other examples, an operating condition determined based on a model (e.g., without a sensor) may be used to detect a cycle of an intelligent component and/or to determine a range of the cycle.

Operating age 214 and/or accumulated wear parameter values 216 may be read and/or written from and/or to component memory 202 by vehicle control system 102 in various implementations (e.g., using system communications interface 122 communicatively coupled wirelessly or via a wired connection to component communications interface 212). Life manager 118 may generate alerts to be provided to an operator using input/output components 130 of operator interface 112 and/or may provide an operating limit 220 to PSC 120 to inhibit one or more aspects of the operation of vehicle 104 based on operating age 214 and/or accumulated wear parameter values 216.

For example, operating limit 220 may be provided to, and implemented by, propulsion system controller 120 (e.g., a traction control system for vehicle 104) when one or more available wear parameter values falls or drops below a threshold for that value. For example, in one suitable implementation, when an intelligent wheel has been operated for too many revolutions (e.g., more revolutions than a threshold number of revolutions for a given operating age) in a particular torque range, a remaining available number of revolutions at the current operating age in that torque range may drop below a respective threshold. In response, a corrective action in the form of operating limit 220 may be provided that includes instructions to PSC 120 to prevent further operation of vehicle 104 that would result in additional revolutions of the wheel in that torque range or operation of vehicle 104 that would result in a speed limit violation for vehicle 104. In this way, an operator of vehicle 104 may be induced to take other corrective action such as payload reduction for a subsequent haul.

As another example, when an intelligent IGBT has been operated for too many thermal cycles (e.g., more thermal cycles than a threshold number of thermal cycles for a particular operating age) that span a particular temperature range, a remaining available number of thermal cycles at the current operating age in that temperature range may fall below a respective threshold. In response, a corrective action in the form of operating limit 220 may include instructions to PSC 120 to prevent further operation of vehicle 104 that results in additional thermal cycles of the IGBT in that temperature range or that results in a speed limit violation for vehicle 104 (e.g., to induce an operator of vehicle 104 to take additional corrective actions such as a payload reduction for a subsequent haul). Preventing operation of a component in a particular temperature range can include limiting operation of the vehicle, limiting operation of the component, and/or providing additional cooling to the component (e.g., by providing additional air, gas, or liquid cooling to the component itself and/or to a heat sink thermally coupled to the component).

As yet another example, when an intelligent alternator has been operated for too many pole bolt speed cycles (e.g., more pole bolt speed cycles than a threshold number of pole bolt speed cycles for a particular operating age) that span a particular speed cycle range, a remaining available number of pole bolt speed cycles at the current operating age in that speed cycle range may fall below a respective threshold. In response, a corrective action in the form of operating limit 220 may include instructions to PSC 120 to prevent further operation of vehicle 104 that results in additional pole bolt speed cycles of the intelligent alternator in that speed cycle range or that results in a speed limit violation for vehicle 104 (e.g., to induce an operator of vehicle 104 to take additional corrective actions such as a payload reduction for a subsequent haul).

In some scenarios, additional corrective actions, that may be taken when one or more available wear parameter values of a component fall below a threshold, may include swapping the component with a corresponding component of another vehicle with, for example, a less strenuous hauling assignment. In this respect, it can be particularly advantageous to have accumulated wear parameter values and the operating age for a component stored in component memory of the component and accessible by a new system such as a different vehicle into which the component is moved (e.g., for determination of projected and available wear parameter values by the new vehicle).

Although various examples are described herein in which corrective action for a component is taken when one or more available wear parameters fall below a threshold and thus indicate overuse of the component, it should be appreciated that the systems and methods described herein may also be applied to generate corrective actions for underuse of a component (e.g., when one or more available wear parameters are greater than an upper threshold). Corrective actions for underuse of a component may include, for example, reducing cooling operations for a vehicle in which the component is disposed to increase wear of the component as a trade-off for more efficient, lower noise, and/or better performance operation of the overall vehicle system. Reducing cooling operations may include decreasing engine ramping that is performed for cooling or reducing a blower operating speed of a blower that is used for cooling (as examples).

In some scenarios, additional corrective actions, that may be taken when one or more available wear parameter values of a component rise above an upper threshold, may include swapping the component with a corresponding component of another vehicle with, for example, a more strenuous hauling assignment or reassigning the vehicle having the component to a more strenuous hauling cycle. For example, life manager 118 may generate alerts to be provided to an operator using input/output components 130 of operator interface 112 or alerts to be provided to a mine dispatch system that the vehicle and/or the component can be switched to the more strenuous haul. In this way, the systems and methods disclosed herein can help optimize life and haul efficiency for a system having one or more vehicles such as vehicle 104 (e.g., a system of mining haul trucks).

In various implementations, a projected wear parameter value for intelligent component 200 may be determined and/or maintained by vehicle control system 102. The projected wear parameter value may indicate the expected amount of wear of the intelligent component at the current operating age. Accordingly, during operation of the intelligent component, the projected wear parameter value may increase (e.g., as operating age 214 is incremented or advanced during operation of intelligent component 200). Projected wear parameter values may, for example, include a projected number of revolutions of a wheel at a particular operating age, a projected number of thermal cycles of an IGBT at a particular operating age, a projected number of revolutions of a wheel in a particular torque range at a particular operating age, and/or a projected number of thermal cycles of an IGBT in a particular temperature range at a particular operating age that increases with an increase of operating age 214. The projected available wear parameter value, at a particular operating age, may be compared with the accumulated wear parameter value at that operating age. The projected available wear parameter value may be determined, in one example, by adding a product of a growth rate and the operating age to an initialization value, as discussed in further detail hereinafter.

In order to limit the accumulated wear of a component at a particular age, the comparison of the projected wear parameter value with the accumulated wear parameter value may be used to determine an available wear parameter value (e.g., by subtracting the accumulated wear parameter value from the projected wear parameter value). The difference between the accumulated wear parameter value and the projected wear parameter value (e.g., the available wear parameter value) may be compared to one or more thresholds such as a first or upper threshold and/or second or lower threshold.

As the operating age of a component increases, an available wear parameter value such as an available number of cycles for the component may increase, decrease, or remain constant depending on an associated accumulated wear parameter value and an associated projected wear parameter value that increases with the operating age. For example, as the operating age of a component increases without operation of the component, or without operation of the component in a particular operating condition range, the available wear parameter (e.g., in that range) may increase with the increasing projected available wear parameter value. As another example, as the operating age of a component increases and the accumulated wear parameter value of the component increases during operation of the component, or during operation of the component in a particular range, the available wear parameter value (e.g., in that range) may decrease or remain constant depending on whether the accumulated wear occurs faster than the increase in projected wear with component age.

For example, the available number of revolutions of a wheel at a particular operating age of the wheel, the available number of thermal cycles of an IGBT at a particular operating age of the IGBT, the available number of revolutions of a wheel in a particular torque range at a particular operating age of the wheel, and/or the available number of thermal cycles of an IGBT in a particular temperature range at a particular operating age of the IGBT may increase, decrease, or remain constant with an increase of operating age 214 based on usage as the operating age is advanced.

Additionally, in some implementations, a "life acceleration factor" or "life deceleration factor" may be applied to and/or modified for certain projected available wear parameter(s) to decrease or extend an anticipated life of an intelligent component. These life acceleration or life deceleration factors may be based on a desired application and/or a customer preference for a component's planned longevity. The life acceleration or life deceleration factors may also allow a component's life to be decreased, or possibly increased, intentionally.

The life acceleration or life deceleration factors may be statically applied to the projected available wear parameters, manually input by a customer, field service maintainer, etc. to be applied to the projected available wear parameters, or dynamically applied based on, for example, operational or environmental factors or conditions. For example, an environmental condition such as a particulate count sample measurement may be obtained (e.g., by a particulate sensor) for gear case oil in an intelligent wheel.

A detection of poor oil quality in the intelligent wheel gear case (e.g., based on a high particulate count or other monitoring and/or measurements) may result in a decreased life expectation for the intelligent wheel, which may be applied using a "knock down factor" or life acceleration factor on the expected life. In this particular example of a wheel with poor gear case oil quality, the life acceleration factor may be realized by decreasing gearing revolutions in the available revolutions for the wheel at the current age, decreasing the gearing revolutions in the projected revolutions for the wheel at the current age, or by decreasing the growth rate for calculating the projected revolutions for the wheel based on the operating age (e.g., for a particular torque range or for two or more torque range bins).

Likewise, very good oil maintenance and oil quality measurements (e.g., low particulate counts in the intelligent wheel gear case oil) may extend the life of the wheel by application of a life deceleration factor. In this particular example of a wheel with very good oil maintenance, the life deceleration factor may be realized by increasing gearing revolutions in the available revolutions for the wheel at the current age, increasing the gearing revolutions in the projected revolutions for the wheel at the current age, or by increasing the growth rate for calculating the projected revolutions for the wheel based on the operating age (e.g., for a particular torque range or for two or more torque range bins).

Figure 3:
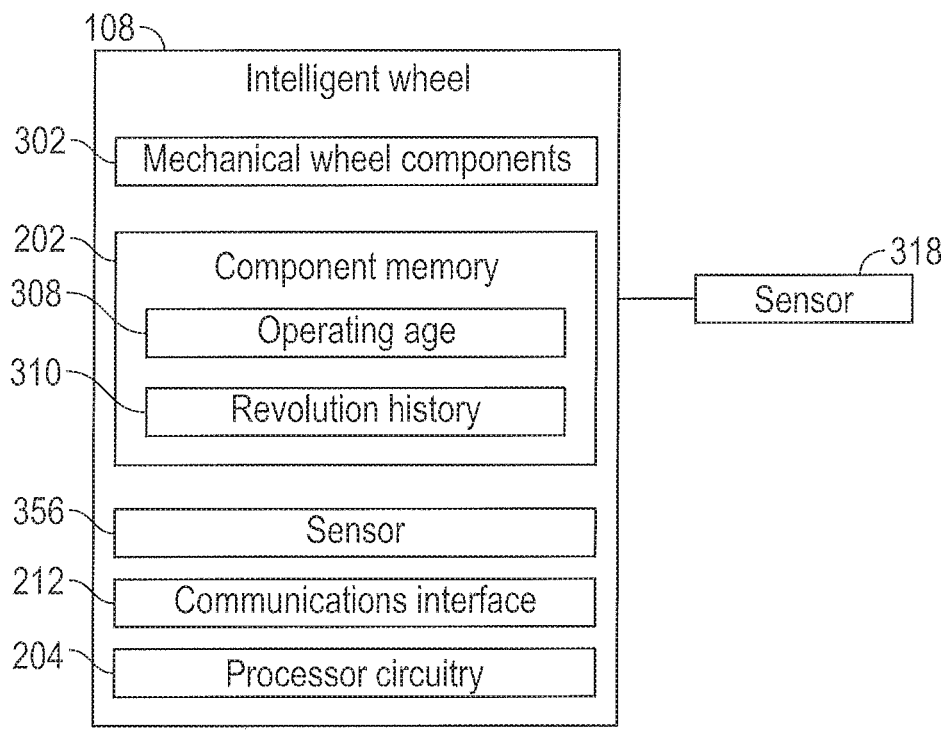
FIG. 3 illustrates a block diagram of an intelligent component implemented as an intelligent wheel in accordance with various aspects of the subject technology.
Figure 4:
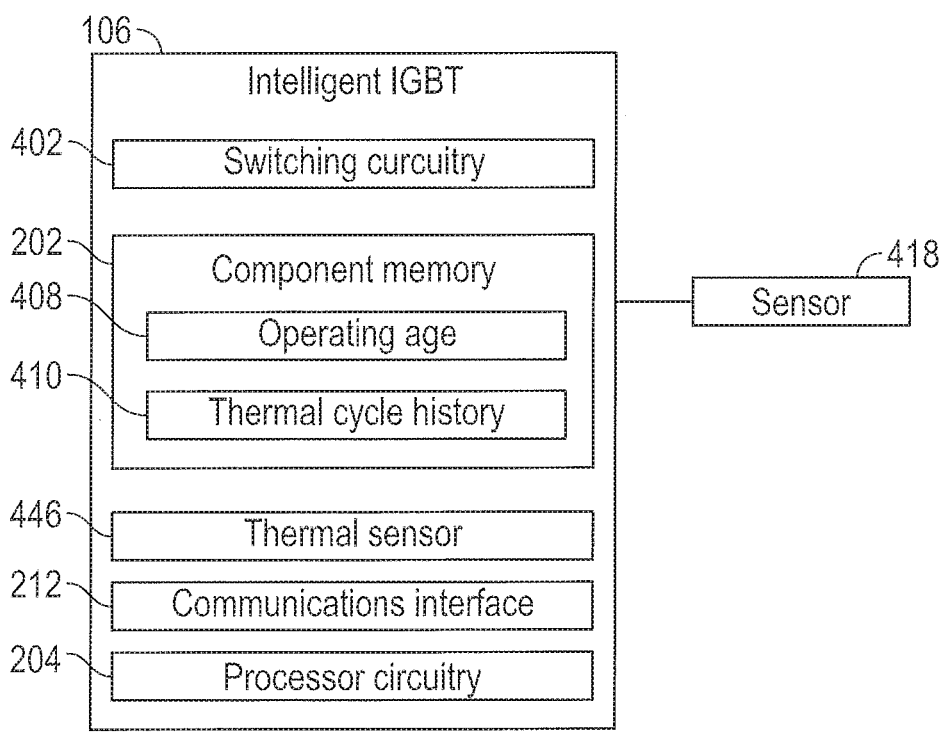
FIG. 4 illustrates a block diagram of an intelligent component implemented as an intelligent electronic switching component in accordance with various aspects of the subject technology.

FIGS. 3 and 4 are illustrative block diagrams, respectively showing how intelligent component 200 may be implemented as an intelligent wheel or an intelligent IGBT. With respect to FIG. 3, a block diagram of an exemplary intelligent wheel 108 as an implementation of intelligent component 200 of FIG. 2 is shown. As shown in FIG. 3, intelligent wheel 108 may include wheel-specific components such as mechanical wheel components 302 and one or more sensors such as sensor 356, and intelligence components such as component memory 202, communications interface 212, and processor circuitry 204.

Mechanical wheel components 302 may be a wheel-specific implementation of mechanical components 208 of FIG. 2. For example, mechanical components 302 may include one or more gears, bearings, lugs, nuts, brake rotors, or other wheel components as would be understood by one skilled in the art.

Processor circuitry 204 may be provided for managing communication, via communications interface 212, with vehicle control system 102 (e.g., with life manager 118 via system communications interface 122), and for interaction with component memory 202, internal sensor 356 (e.g., an implementation of sensor 210), and/or an external sensor 318 (e.g., a wheel-specific implementation of sensor 218). In some implementations, processor circuitry 204 may also run a wear model (e.g., a thermal model or a fatigue model) using, for example, communicated software variables (e.g., model parameters or other operating condition values) passed between intelligent component 200 and vehicle control system 102. For example, the wear model operation may be used to determine operating conditions (e.g., a temperature of an IGBT, revolutions of a wheel, or a pole bolt speed of an alternator) based on the model and other known operating conditions of the vehicle and/or the intelligent component. In implementations in which operating conditions are determined based on a model calculation, the intelligent component may be provided without a sensor such as sensor 210 and/or sensor 218 (e.g., the wear model may be explicitly dependent on already existing software variables stored at the component or in the system processor circuitry and/or calculated model inputs/outputs). The wear model may run solely in one processor such as processor circuitry 204 of the intelligent component or processor circuitry 123 on the vehicle control system and/or may be distributed between the processor circuitry of the component and the vehicle. In one example, the temperature of a switching component may be determined using a thermal model and electrical measurements corresponding to the switching operations of the switching component.

Sensor 356 and/or other sensors incorporated into and/or separate from intelligent wheel 108 (see, e.g., external sensor 318) may be used to determine the rotational speed and/or detect each revolution of intelligent wheel 108 during operation of intelligent wheel 108. Sensor signals from sensor 356 may be transmitted (e.g., using communications interface 212) to life manager 118 of vehicle control system 102 and may be processed to determine a rotational speed and/or identify a revolution of intelligent wheel 108. TCI 119 and/or PSC 120 may provide additional information to life manager 118 such as operating condition information that indicates one or more operating conditions under which intelligent wheel 108 is operated. The operating condition information may be used (e.g., by life manager 118) to monitor the operating conditions of intelligent wheel 108 over one or more of operating condition ranges such as torque ranges. For example, TCI 119 and/or PSC 120 may determine a torque applied to intelligent wheel 108 during each revolution of intelligent wheel 108 and provide the determined torque for each revolution to life manager 118.

Component memory 202 of intelligent wheel 108 may store one or more accumulated wear parameter values and/or an operating age 308 for intelligent wheel 108. In the example of FIG. 3, accumulated wear parameter values 216 are implemented as accumulated numbers of revolutions in a revolution history 310 for intelligent wheel 108. In some implementations, the accumulated number of revolutions may include one or more accumulated numbers of revolutions for one or more respective operating ranges of an operating condition such as an accumulated number of revolutions for each of multiple applied torque ranges. For example, revolution history 310 may include accumulated revolution counts in one or more applied torque bins as described in further detail hereinafter.

In some implementations, component memory 202 may store instructions that, when executed by processor circuitry 204 perform some or all of the operations of life manager 118 at the intelligent wheel. However, this is merely illustrative. In other implementations, the operations of life manager 118 may be performed, and/or some or all of the information used and managed by life manager 118 (e.g., including operating age 308 and revolution history 310) may be read out and stored at the vehicle control system and/or on a remote system such as a centralized control system for multiple vehicles and the components thereof.

Sensors 356 and 318 may be sensors that measure the number of revolutions and/or the speed of revolution of intelligent wheel 108. Sensors 356 and 318 may be implemented as, for example, magnetic sensors that detect a magnetic field that is modulated by the rotation of the wheel (e.g., by a complete revolution or by a partial revolution) or other suitable sensors as would be understood by one skilled in the art.

An exemplary implementation of life management for intelligent wheel 108 will now be described. In this exemplary implementation, operating age 308 may be stored in component memory 202 (e.g., in units of hours at operating speed). In this exemplary implementation, accumulated wear parameter values for intelligent wheel 108 include revolutions history 310 implemented as a matrix of accumulated gearing revolutions distributed across various torque ranges. An example of a matrix of accumulated gearing revolutions distributed across various torque ranges, the matrix sometimes referred to herein as a life utilization matrix, is provided below:

|  | Bin | | | | |
| --- | --- | --- | --- | --- | --- |
|  | 1 | 2 | 3 | 4 | 5 |
| Torque Range | 0-5 klbft | 5 klbft-10 klbft | 10 klbft-15 klbft | 20 klbft-25 klbft | 25 klbft-30 klbft |
| Accumulated Revolutions | AR1 | AR2 | AR3 | AR4 | AR5 |

The life utilization matrix above includes five accumulated wear parameter values AR1, AR2, AR3, AR4, and AR5, each corresponding to a torque bin. Each torque bin corresponds to a range of torques, measured in kilopound feet (klbft) in this example. Each accumulated wear parameter value AR1, AR2, AR3, AR4, and AR5 may be a number of revolutions of intelligent wheel 108 that occurred while a torque in the corresponding torque bin was applied to intelligent wheel 108. The values of each of AR1, AR2, AR3, AR4, and AR5 may be determined and/or maintained based on counted wheel revolutions using sensor feedback from sensor 356 and/or 318, along with correlated torque feedback provided, for example, by vehicle control system 102. The life utilization matrix may be maintained and/or stored in component memory 202 and/or system memory 116 in various implementations. The life utilization matrix and/or the operating age may be updated and stored in the component memory at predetermined intervals (e.g., continuously or periodically during operation of vehicle 104, at the end of a haul, the end of an operator shift, the end of a work day, another work period or other predetermined period of time).

Life manager 118 may perform operations based on the life utilization matrix (or other implementations of accumulated wear parameter values) to coordinate and manage (a) monitoring of life utilization, (b) corrective actions such as operator advisements, and/or (c) corrective actions such as vehicle level restrictions or operating limits. Life manager 118 may provide instructions to, for example, a traction control system of PSC 120 that is responsible for overall vehicle traction control to provide enforcement of speed and/or torque limitations generated by the life manager.

In some implementations, life manager 118 may generate, maintain, and/or update projected wear parameter values implemented as a matrix style counter including a matrix of projected gearing revolutions distributed across the torque ranges of the life utilization matrix for a particular operating age of intelligent wheel 108. An example of a matrix of projected gearing revolutions distributed across various torque ranges, sometimes referred to herein as a life growth matrix, is provided below:

|  | Bin | | | | |
| --- | --- | --- | --- | --- | --- |
|  | 1 | 2 | 3 | 4 | 5 |
| Torque Range | 0-5 klbft | 5 klbft-10 klbft | 10 klbft-15 klbft | 20 klbft-25 klbft | 25 klbft-30 klbft |
| Projected Revolutions | ER1 = init1 + GR1 * operating age | ER2 = init2 + GR2 * operating age | ER3 = init3 + GR3 * operating age | ER4 = init4 + GR4 * operating age | ER5 = init5 + GR5 * operating age |

The life growth matrix above includes five projected wear parameter values ER1, ER2, ER3, ER4, and ER5, each corresponding to one of the torque bins of the life utilization matrix above. ER1, ER2, ER3, ER4, and ER5 may each represent a projected or expected number of revolutions of intelligent wheel 108 at a particular operating age. As shown in the exemplary life growth matrix above, each projected number of revolutions ER1, ER2, ER3, ER4, and ER5 may be determined by adding an initialization value (e.g., init1, init2, init3, init4, init5) to a growth factor (e.g., GR1, GR2, GR3, GR4, GR5) multiplied by the operating age. The initialization values may be set to a predetermined value to ensure that a new component that has never been operated (e.g., a wheel with an operating age of zero) has a non-zero initial projected wear parameter value and, thus, will not cause an alert or an operating restriction. The growth factors and initialization values of the life growth matrix may be the same across multiple bins or may be set to different values for each bin.

For example, the growth rate for each torque bin may be determined based on a design limit on gear revolutions in the torque range for that torque bin, divided by a lifetime or mean time between overhaul (MTBO) for the wheel.

During operation of vehicle 104, life manager 118 may advance operating age 308, and the values ER1-ER5 of the life growth matrix are increased accordingly. Life manager 118 may determine one or more available wear parameter values for intelligent wheel 108, the available wear parameters implemented, in this example, as a matrix of available gearing revolutions distributed across various torque ranges. An example of a matrix of available gearing revolutions distributed across the various torque ranges of the life utilization matrix and the life growth matrix, sometimes referred to herein as a life bank matrix, is provided below:

|  | Bin | | | | |
| --- | --- | --- | --- | --- | --- |
|  | 1 | 2 | 3 | 4 | 5 |
| Torque Range | 0-5 klbft | 5 klbft-10 klbft | 10 klbft-15 klbft | 20 klbft-25 klbft | 25 klbft-30 klbft |
| Available Revolutions | Av1 = (−) or (+) # of available revolutions | Av2 = (−) or (+) # of available revolutions | Av3 = (−) or (+) # of available revolutions | Av4 = (−) or (+) # of available revolutions | Av5 = (−) or (+) # of available revolutions |

The life bank matrix above includes five available wear parameter values Av1, Av2, Av3, Av4, and Av5, each corresponding to a respective one of the torque bins of the life utilization matrix discussed above. Av1, Av2, Av3, Av4, and Av5, may each represent an available number of revolutions of intelligent wheel 108 at a particular operating age, in a corresponding torque range. As shown in the exemplary life bank matrix above, each available number of revolutions (Av1, Av2, Av3, Av4, and Av5) may be a positive (+) or negative (−) number of revolutions as determined, for example, by subtracting the values of the life utilization matrix (AR1, AR2, AR3, AR4, and AR5) from the corresponding values of the life growth matrix (ER1, ER2, ER3, ER4, and ER5).

Life manager 118 may determine whether to provide a correction such as an operator alert or an operating restriction based upon whether any or all of the bins of the life bank matrix have a surplus (+) of gearing revolutions or a deficit (−) of revolutions at current point (e.g., the current operating age) in the wheel life.

Life manager 118 may store one or more thresholds (e.g., one or more thresholds for each bin). For example, life manager 118 may store a first threshold and a second threshold for each bin. If it is determined that any of available revolutions values Av1, Av2, Av3, Av4, and/or Av5 violates (e.g., falls below) the first threshold, an alert may be provided to operator interface 112 of vehicle 104. If it is determined that any of available revolutions values Av1, Av2, Av3, Av4, and/or Av5 violates (e.g., falls below) the second threshold, an alert may be provided to operator interface 112 of vehicle 104 and an operating limit may be provided to PSC 120. Life manager 118 may also store one or more upper thresholds for identifying underuse of the intelligent wheel.

In one exemplary usage scenario, life manager 118 may store a first threshold of +200 gearing revolutions and a second threshold of −200 gearing revolutions for the 25 klbft-30 kbft bin of the life bank matrix. When a "yellow line" limit is reached in the life bank matrix (e.g., Av5 falls below the first threshold of +200 revolutions), life manager 118 may send a "Yellow" operator advisement alert for display using operator interface 112. When a "red line" limit is reached in the life bank matrix (e.g., Av5 falls below the second threshold of −200 revolutions), the life manager 118 may send a "Red" operator advisement alert for display using operator interface 112. Additionally, when Av5 falls below +200 revolutions and/or −200 revolutions, life manager 118 may impose an operating limit such as a speed limit, a torque limit, or a load limit to reduce, and/or induce the operator to correct the payload and reduce, the tractive effort required on each haul loop. For example, life manager 118 may hold a restriction flag input HIGH to the traction controller. The traction controller may then enforce speed-limited operation. After operating vehicle 104 such that Av5 increases above, for example −200 revolutions (e.g., due to lack of accumulated revolutions and growth of projected revolutions in the 25 klbft-30 kbft bin due to a reduced payload in a next haul loop), life manager 118 may remove the operating limit (e.g., by lifting the restriction flag to the traction controller). Life management systems and methods as described herein may be applied to maximize or enhance, for example, gearing life for an intelligent wheel such as intelligent wheel 108.

In another exemplary usage scenario, life manager 118 may store an upper threshold of +1000 gearing revolutions for the 25 klbft-30 kbft bin of the life bank matrix. When a limit is reached in the life bank matrix (e.g., Av5 rises above the upper threshold of +1000 revolutions), life manager 118 may send an operator advisement alert for display using operator interface 112 and/or may send a dispatch advisement to a dispatch system indicating underuse of the intelligent wheel (e.g., alerts indicating the intelligent wheel or the vehicle itself can be moved to a more strenuous haul). Additionally, when Av5 rises above +1000 revolutions, life manager 118 may modify operation of other vehicle systems (e.g., by reducing cooling operations as described herein).

The above exemplary implementation is merely illustrative. In other implementations, speed sensor feedback (e.g., revolutions per minute (RPM) feedback) may be monitored and integrated over time for each haul cycle. A haul cycle may be defined as the time period from one payload dump to a subsequent payload dump (e.g., as measured by payload monitor 114). A counter of, for example, the vehicle control system may increment according to a table of motoring torque breakpoints and associated incrementation scale factors. Depending on the current operating torque levels as calculated by the vehicle control system, the system may appropriately scale RPM feedback and integrate the scaled RPM with respect to time. When the counter has reached a defined revolution limit or threshold, the system may impose a speed limit for the remaining duration of that specific haul cycle (e.g., until a dump is registered). This speed limit may be logged with an associated fault on a display such as an LCD panel notifying the operator that prolonged high torque operation has been detected.

Corrective actions for threshold violations may include light loading or reducing payload for a next haul cycle. Once the counter has saturated at a defined revolution limit, the counter may recover though a countdown in which, when torque falls below the lowest torque breakpoint in the table, the counter value is decremented at a dynamic rate that may be a function of one or more other system variables (e.g., torque, horse power, speed, etc.) and/or defined to countdown to zero linearly over a defined time interval. However, if torque again exceeds any of the breakpoints in the table, then the counter may again begin to increment.

Although the example of FIG. 3 shows intelligent component 200 of FIG. 2 implemented as an intelligent wheel, this is merely illustrative. In another illustrative example, intelligent component 200 may be implemented as an intelligent switching component as shown in FIG. 4. As shown in FIG. 4, intelligent IGBT 106 may include switching-component-specific components such as switching circuitry 402 and thermal sensor 446, and intelligence components such as component memory 202, communications interface 212, and processor circuitry 204.

Switching circuitry 402 may be a switching-component-specific implementation of component circuitry 206 of FIG. 2. Switching circuitry 402 may include one or more semiconductor terminals (e.g., three terminals) for performing switching operations.

Processor circuitry 204 may be provided for communication, via communications interface 212, with vehicle control system 102 (e.g., with life manager 118 via system communications interface 122), and for interaction with component memory 202, component communications interface 212, integrated thermal sensor 446 (e.g., an implementation of sensor 210), and/or an external sensor 418 (e.g., an implementation of sensor 218 as an external thermal sensor for intelligent IGBT 106).

Thermal sensor 446 may be a thermistor or other temperature sensing element that generates temperature signals or other electronic signals from which the temperature of intelligent IGBT 106 may be determined during switching operations of switching circuitry 402. Thermal sensor 446 and/or other temperature sensors incorporated into and/or separate from intelligent IGBT 106 (see, e.g., external thermal sensor 418) may be used to determine the temperature of intelligent IGBT 106 at various sample times during operation of intelligent IGBT 106. Temperature measurements or electronic signals from which temperature measurements can be determined by a life manager, may be transmitted (e.g., using communications interface 212) to life manager 118 of vehicle control system 102. Temperature measurements from thermal sensor 446 and/or 418 may be used to monitor an operating condition (e.g., a temperature) of intelligent IGBT 106 over one or more operating ranges such as temperature ranges of thermal cycles of intelligent IGBT. For example, temperature measurements from sensor 356 may be used to identify a thermal cycle experienced by intelligent IGBT 106 and/or to identify a temperature range of the thermal cycle (e.g., a range between a low temperature of the cycle and a high temperature of the cycle).

Component memory 202 of intelligent IGBT 106 may store one or more accumulated wear parameter values and/or an operating age 408 for intelligent IGBT 106. Accumulated wear parameter values for intelligent IGBT 106 may be stored as a thermal cycle history 410 which may include an accumulated number of thermal cycles that have been experienced by intelligent IGBT 106, for example. In some implementations, the accumulated number of thermal cycles may include one or more accumulated numbers of thermal cycles for one or more respective operating ranges of an operating condition such as an accumulated number of thermal cycles for each of multiple temperature ranges.

In some implementations, component memory 202 may store instructions that, when executed by processor circuitry 204 perform some or all of the operations of life manager 118 at the intelligent IGBT 106. However, this is merely illustrative. In other implementations, the operations of life manager 118 may be performed, and/or some or all of the information used and managed by life manager 118 (e.g., including operating age 408 and thermal cycle history 410) may be read out and stored at the vehicle control system and/or on a remote system such as a centralized control system for multiple vehicles and the components thereof.

Similar to the description above in connection with FIG. 3, life manager 118 may generate, maintain, update, and/or act based on one or more wear parameter values for intelligent IGBT 106 such as a life utilization matrix, a life growth matrix, and a life bank matrix. A life utilization matrix for intelligent IGBT 106 may be similar to the life utilization matrix described above in connection with intelligent wheel 108, except that the bins may be temperature range bins corresponding to ranges of temperature excursions for intelligent IGBT 106 and the accumulated wear parameter values associated with the respective bins may be accumulated thermal cycle values ATC1, ATC2, ATC3, ATC4, ATC5, etc., measured in units of temperature.

A life growth matrix for intelligent IGBT 106 may be similar to the life growth matrix described above in connection with intelligent wheel 108, except that the bins may be temperature range bins corresponding to the temperature range bins of the life utilization matrix for intelligent IGBT 106 and the projected wear parameter values associated with the respective bins may be projected thermal cycle values ETC1, ETC2, ETC3, ETC4, ETC5, etc. ETC1, ETC2, ETC3, ETC4, ETC5, etc. may be determined by adding an initialization value to the result of a multiplication of a growth rate (e.g., temperature-bin specific growth rate or a common growth rate for all bins) and the operating age 408.

A life bank matrix may be determined by subtracting the accumulated thermal cycle values ATC1, ATC2, ATC3, ATC4, ATC5, etc. from the projected thermal cycle values ETC1, ETC2, ETC3, ETC4, ETC5, etc. to determine available thermal cycle values AvTC1, AvTC2, AvTC3, AvTC4, AvTC5, etc. of the life bank matrix. Matrices for intelligent IGBT 106 may have more, less, or the same number of bins as the matrices for intelligent wheel 108. In some scenarios, accumulated, projected, and available wear parameter values for intelligent IGBT 106 may be overall (e.g., unbinned) thermal cycle counts.

Similar to the description above in connection with FIG. 3, life manager 118 may generate, maintain, update, and/or act based on one or more wear parameter values for intelligent alternator 190 such as a life utilization matrix, a life growth matrix, and a life bank matrix. A life utilization matrix for an intelligent alternator may be similar to the life utilization matrix described above in connection with intelligent wheel 108, except that the bins may be pole bolt speed range bins corresponding to ranges of pole bolt speed excursions for the intelligent alternator and the accumulated wear parameter values associated with the respective bins may be accumulated pole bolt speed cycle values APBS1, APBS2, APBS3, APBS4, APBS5, etc., measured in units of speed.

A life growth matrix for the intelligent alternator may be similar to the life growth matrix described above in connection with intelligent wheel 108, except that the bins may be pole bolt speed range bins corresponding to the pole bolt speed range bins of the life utilization matrix for the intelligent alternator and the projected wear parameter values associated with the respective bins may be projected pole bolt speed cycle values EPBS1, EPBS2, EPBS3, EPBS4, EPBS5, etc. EPBS1, EPBS2, EPBS3, EPBS4, EPBS5, etc. may be determined by adding an initialization value to the result of a multiplication of a growth rate (e.g., pole-bolt-speed-bin specific growth rate or a common growth rate for all bins) and the operating age of the intelligent alternator.

A life bank matrix may be determined by subtracting the accumulated pole bolt speed cycle values APBS1, APBS2, APBS3, APBS4, APBS5, etc. from the projected pole bolt speed cycle values EPBS1, EPBS2, EPBS3, EPBS4, EPBS5, etc to determine available pole bolt speed cycle values AvPBS1, AvPBS2, AvPBS3, AvPBS4, AvPBS5, etc. Matrices for an intelligent alternator may have more, less, or the same number of bins as the matrices for intelligent wheel 108. In some scenarios, accumulated, projected, and available wear parameter values for the intelligent alternator may be overall (e.g., unbinned) pole bolt speed cycle counts.

Figure 5:
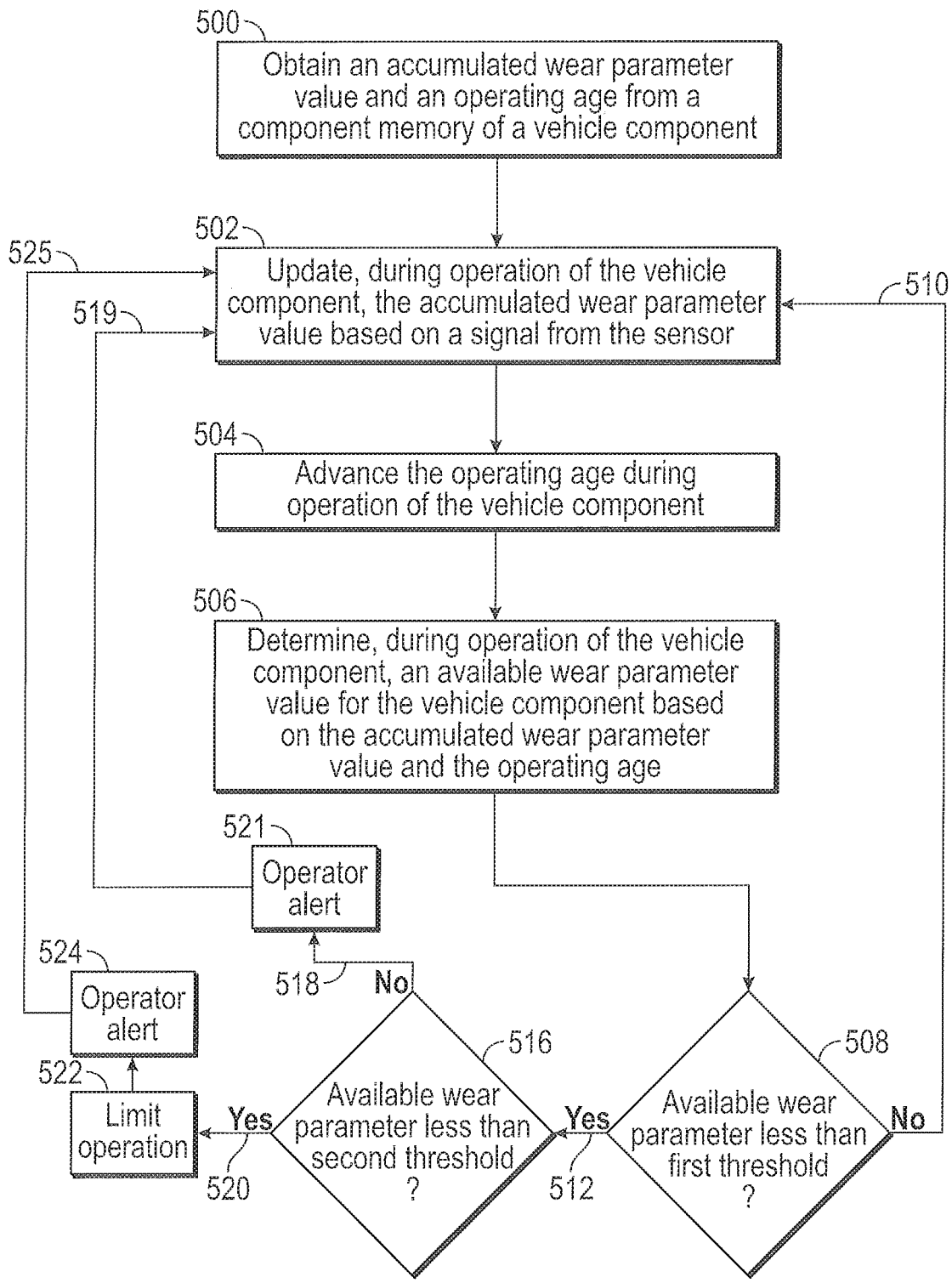
FIG. 5 illustrates a flow diagram of an example process for component wear management for a component in accordance with various aspects of the subject technology.
Figure 6:
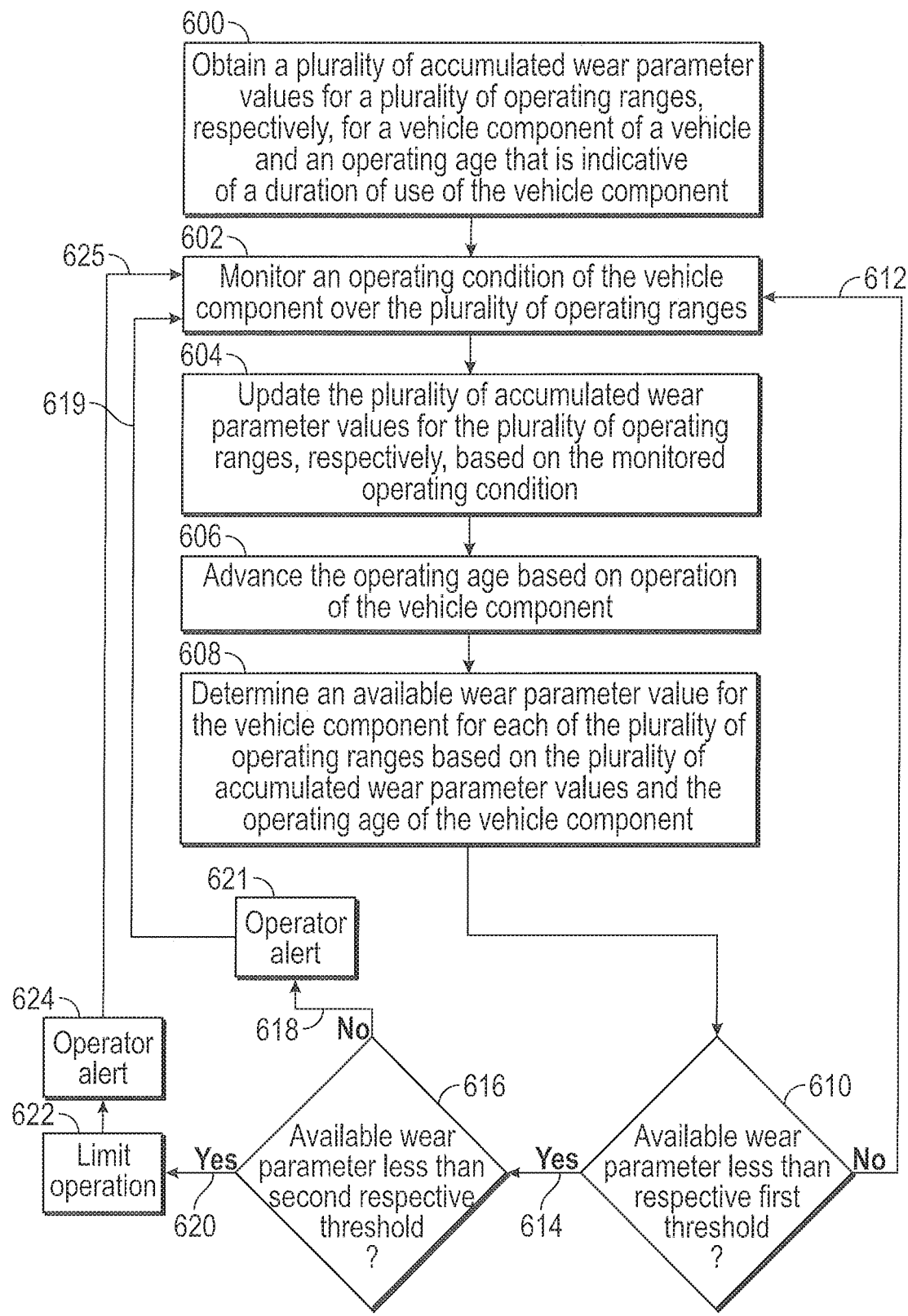
FIG. 6 illustrates a flow diagram of another example process for component wear management in accordance with various aspects of the subject technology.

Various features of the processes that may be performed by vehicle control system 102 for component life management of intelligent components are shown in further detail in FIGS. 5 and 6. More particularly, the flow of FIG. 5 may be used, in some implementations, for component life management using a single accumulated wear parameter. The flow of FIG. 6 may be used, in some implementations, for component life management using multiple accumulated wear parameters such as accumulated wear parameters that are binned according to a monitored operating condition of the component.

For explanatory purposes, the example process of FIG. 5 is described herein with reference to the components of FIGS. 1-4. Further for explanatory purposes, the blocks of the example process of FIG. 5 are described herein as occurring in series, or linearly. However, multiple blocks of the example process of FIG. 5 may occur in parallel. In addition, the blocks of the example process of FIG. 5 need not be performed in the order shown and/or one or more of the blocks of the example process of FIG. 5 need not be performed.

In the depicted example flow diagram, at block 500, an accumulated wear parameter value (e.g., a number of accumulated wheel revolutions of an intelligent wheel or a number of accumulated thermal cycles of an intelligent IGBT) and an operating age may be obtained (e.g., by life manager 118 of vehicle control system 102) from a component memory (e.g., component memory 202) of a vehicle component (e.g., intelligent component 200).

At block 502, during operation of the vehicle component (e.g., as a part of the operation of the vehicle), the accumulated wear parameter value may be updated (e.g., by vehicle control system 102) based on a signal from a sensor such as sensor 210 or sensor 218. For example, an accumulated number of cycles (e.g., wheel revolutions, thermal cycles, or pole bolt speed cycles) may be updated as additional cycles are detected by the sensor(s)).

At block 504, the operating age may be advanced (e.g., by vehicle control system 102 or an intelligent component 106 or 108 may advance their own life via internal onboard processing) during operation of the vehicle component. For example, the operating age may increase proportionally to any additional duration of time during which the component is operated.

At block 506, during operation of the vehicle component, an available wear parameter value for the vehicle component may be determined (e.g., by vehicle control system 102) based on the accumulated wear parameter value and the operating age. Determining the available wear parameter value based on the accumulated wear parameter value and the operating age may include determining a projected wear parameter value based on the operating age, and subtracting the accumulated wear parameter value from the projected wear parameter value. A projected wear parameter value may, for example, be a projected or expected number of revolutions of an intelligent wheel at an age equal to the current operating age. In another example, a projected wear parameter value may, for example, be a projected or expected number of thermal cycles of an intelligent switching component at an age equal to the current operating age. Determining the projected wear parameter value may include adding an initialization value to the result of a multiplication of a growth rate and the operating age.

At block 508, it may be determined (e.g., by vehicle control system 102) whether the available wear parameter is less than a first threshold. For example, vehicle control system 102 may determine whether a number of available gearing revolutions of an intelligent wheel is below a positive revolutions threshold. As another example, the vehicle control system 102 may determine whether a number of available thermal cycles of an intelligent IGBT is below a positive thermal cycle threshold (e.g., a threshold of +200 revolutions).

As indicated by arrow 510, if the available wear parameter value is not below the first threshold, the control system (e.g., vehicle control system 102) may return to block 502. As indicated by arrow 512, if the available wear parameter value is below the first threshold, the control system (e.g., vehicle control system 102) may proceed to block 516.

At block 516, it may be determined (e.g., by vehicle control system 102) whether the available wear parameter is less than a second threshold. For example, the vehicle control system 102 may determine whether a number of available gearing revolutions of an intelligent wheel is below a smaller positive revolutions threshold such as a threshold of +100 revolutions, a threshold of zero, or a negative revolutions threshold such as a threshold of −200 revolutions. As another example, the vehicle control system 102 may determine whether a number of available thermal cycles of an intelligent IGBT is below a smaller positive thermal cycle threshold, a threshold of zero, or a negative thermal cycle threshold.

As indicated by arrow 518, if the available wear parameter value is below the first threshold, but not below the second threshold, the system (e.g., vehicle control system 102) may proceed to block 521. At block 521, a first corrective action such as an operator alert may be provided. Providing the operator alert may include providing an audio, visual, or tactile alert using operator interface 112. As indicated by arrow 519, the system may return to block 502 in combination with providing the alert at block 521.

As indicated by arrow 520, if the available wear parameter value is below the first threshold and below the second threshold, the system (e.g., vehicle control system 102) may proceed to block 522. At block 522, an operating limit (see, e.g., operating limit 220 of FIG. 2) may be generated by life manager 118 and implemented by PSC 120. For example, a speed limit, an applied torque limit, a payload limit, or other operating limit may be provided by life manager 118 to PSC 120 and implemented by PSC 120 as described herein as a second corrective action for vehicle 104.

At block 524, in combination with the operating limit imposed at block 522, an additional operator alert may be provided. Providing the additional operator alert may include providing an additional audio, visual, or tactile alert using operator interface 112. The alert provided at block 521 may, for example, be a "Yellow" alert and the alert at block 524 may be a "Red" alert to inform the operator of the severity of the threshold violation. As indicated by arrow 525, the system may return to block 502 in combination with providing the alert at block 524.

Although the operations of FIG. 5 show corrective actions (e.g., operator alerts, inducements, and/or truck restriction(s)) based on threshold violations for the available wear parameter at blocks 508 and 518, it should be appreciated that this is merely illustrative. In other implementations, corrective actions may be taken based on other features of the available wear parameter (e.g., a rate of change of the wear parameter) and/or based on the available wear parameter and other information. For example, a decision to alert an operator may not only be a function of available wear from block 506 but may also be based on other available software inputs or variables such as a truck age, an operating state, a time of day, a vehicle location, weather, a frequency of past restrictive or induced modes of operation, a correlation to other component available wear information on the same vehicle, etc. Accordingly, while two paths 519 and 525 are shown in FIG. 5 in connection with corrective actions, this is merely exemplary, and more or less constructs for corrective action are contemplated. For example, corrective action may be taken based at least on the available wear parameter and, in some implementations based on other inputs or variables as described.

The operations described above in connection with FIG. 5 may be performed in a loop that is continuous during operation of vehicle 104.

The operations described above in connection with FIG. 5 utilize an accumulated wear parameter for component life management. However, as described above in accordance with various aspects of FIGS. 3 and 4 (as examples), in some implementations, multiple accumulated wear parameter values such as binned cycle counts may be utilized and monitored for component life management.

FIG. 6 depicts a flow diagram of an example process for component life management using multiple accumulated wear parameter values such as binned cycle counts, according to aspects of the subject technology. For explanatory purposes, the example process of FIG. 6 is described herein with reference to the components of FIGS. 1-4. Further for explanatory purposes, the blocks of the example process of FIG. 6 are described herein as occurring in series, or linearly. However, multiple blocks of the example process of FIG. 6 may occur in parallel. In addition, the blocks of the example process of FIG. 6 need not be performed in the order shown and/or one or more of the blocks of the example process of FIG. 6 need not be performed.

In the depicted example flow diagram, at block 600, a plurality of accumulated wear parameter values for a plurality of operating ranges, respectively (e.g., a plurality of accumulated wear parameter values in a life utilization matrix having a plurality of bins corresponding to the operating ranges as described herein), for a vehicle component (e.g., intelligent component 200) of a vehicle (e.g., vehicle 104) and an operating age (e.g., operating age 214) that is indicative of a duration of use of the vehicle component may be obtained (e.g., by life manager 118 of vehicle control system 102) from a component memory (e.g., component memory 202). The plurality of accumulated wear parameter values and the operating age may be obtained at the beginning of a haul cycle, at the beginning of a work day, at the beginning of a work week, upon installation of the component, continuously, or at other suitable times.

At block 602, an operating condition (e.g., an applied torque for an intelligent wheel, a temperature for an intelligent IGBT, or a pole bolt speed for an intelligent alternator) of the vehicle component may be monitored (e.g., by vehicle control system 102) over the plurality of operating ranges. Monitoring the operating condition may include obtaining monitoring signals from sensors such as revolution sensors, thermistors, or other vehicle system sensors as described herein.

At block 604, the plurality of accumulated wear parameter values for the plurality of operating ranges, respectively, may be updated (e.g., by vehicle control system 102) based on the monitored operating condition. For example, any or all of the available revolution/cycle values for any bin of the life utilization matrix may be updated if revolutions/cycles have occurred in that bin during the monitoring.

At block 606, the operating age may be advanced (e.g., incremented) based on operation of the vehicle component (e.g., by vehicle control system 102 or the onboard processing on an intelligent component 106/108).

At block 608, an available wear parameter value for the vehicle component for each of the plurality of operating ranges may be determined based on the plurality of accumulated wear parameter values and the operating age of the vehicle component. Determining the available wear parameter value for each of the plurality of operating ranges may include (a) determining a life growth matrix having a plurality of projected wear parameter values for each of the plurality of operating ranges based on the operating age and (b) subtracting the accumulated wear parameter values of the life utilization matrix from the projected wear parameter values of the life growth matrix to generate a life bank matrix as described above in connection with, for example, FIGS. 3 and 4. Determining the plurality of projected wear parameter values for each of the plurality of operating ranges may include adding, for each of the plurality of operating ranges, an initialization value to the result of a multiplication of a growth rate for that range and the operating age.

At block 610, it may be determined (e.g., by vehicle control system 102) whether any of available wear parameter values (e.g., any of the values of the life bank matrix) is less than a respective first threshold (e.g., a threshold corresponding to the respective bin of the life bank matrix). For example, the vehicle control system 102 may determine whether any of the numbers of available gearing revolution values Av1, Av2, Av3, Av4, or Av5 of an intelligent wheel is below a positive revolutions threshold. The positive revolutions threshold may be the same for each torque bin or may be a torque-bin-specific threshold. As another example, the vehicle control system 102 may determine whether any of the numbers of available thermal cycle values AvTC1, AvTC2, AvTC3, AvTC4, AvTC5, etc. of an intelligent IGBT is below a positive thermal cycle threshold (e.g., a first threshold for the temperature bin corresponding to that available thermal cycles value). As another example, the vehicle control system 102 may determine whether any of the numbers of available pole bolt speed cycle values AvPBS1, AvPBS2, AvPBS3, AvPBS4, AvPBS5, etc. of an intelligent alternator is below a positive pole bolt speed cycle threshold (e.g., a first threshold for the pole bolt speed bin corresponding to that available pole bolt speed cycles value).

As indicated by arrow 612, if none of the available wear parameter values is below the first threshold, the control system (e.g., vehicle control system 102) may return to block 602. As indicated by arrow 614, if any of the available wear parameter values is below the first threshold, the control system (e.g., vehicle control system 102) may proceed to block 616.

At block 616, it may be determined (e.g., by vehicle control system 102) whether any of the available wear parameter values is less than a second threshold. For example, the vehicle control system 102 may determine whether any of the numbers of available gearing revolution values Av1, Av2, Av3, Av4, or Av5 of an intelligent wheel is below a smaller positive revolutions threshold, a threshold of zero, or a negative revolutions threshold. The smaller positive or negative revolutions threshold may be the same for each torque bin or may be a torque-bin-specific threshold. As another example, the vehicle control system 102 may determine whether any of the numbers of available thermal cycle values ATC1, ATC2, ATC3, ATC4, ATC5, etc. of an intelligent IGBT is below a smaller positive revolutions threshold, a threshold of zero, or a negative revolutions threshold (e.g., a second threshold for the temperature bin corresponding to that available thermal cycles value). As another example, the vehicle control system 102 may determine whether any of the numbers of available pole bolt speed cycle values APBS1, APBS2, APBS3, APBS4, APBS5, etc. of an intelligent alternator is below a smaller positive revolutions threshold, a threshold of zero, or a negative revolutions threshold (e.g., a second threshold for the pole bolt speed bin corresponding to that available pole bolt speed cycles value).

As indicated by arrow 618, if none of the available wear parameter values that are below the first threshold are below the second threshold, the system (e.g., vehicle control system 102) may proceed to block 621. At block 621, a first corrective action such as an operator alert may be provided. Providing the operator alert may include providing an audio, visual, or tactile alert using operator interface 112. As indicated by arrow 619, the system may return to block 602 in combination with providing the alert at block 621.

As indicated by arrow 620, if any of the available wear parameter values are below the first threshold and below the second threshold, the system (e.g., vehicle control system 102) may proceed to block 622. At block 622, a second corrective action such as an operational limit may be generated by life manager 118 and implemented by PSC 120. For example, a speed limit, an applied torque limit, a payload limit, or other operating limit may be provided by life manager 118 to PSC 120 and implemented by PSC 120 as described herein.

At block 624, in combination with the operating limit imposed at block 622, an additional operator alert may be provided. Providing the additional operator alert may include providing an additional audio, visual, or tactile alert using operator interface 112. The alert provided at block 621 may, for example, be a "Yellow" alert and the alert at block 624 may be a "Red" alert to inform the operator of the severity of the threshold violation. As indicated by arrow 625, the system may return to block 602 in combination with providing the alert at block 624.

Although the operations of FIG. 6 show corrective actions (e.g., operator alerts, inducements, and/or truck restriction(s)) based on threshold violations for the available wear parameters at blocks 610 and 616, it should be appreciated that this is merely illustrative. In other implementations, corrective actions may be taken based on other features of the available wear parameter (e.g., a rate of change of the wear parameter) and/or based on the available wear parameter and other information. For example, a decision to alert an operator may not only be a function of available wear from block 608 but may also be based on other available software inputs or variables such as a truck age, an operating state, a time of day, a vehicle location, weather, a frequency of past restrictive or induced modes of operation, a correlation to other component available wear information on the same vehicle, etc. Accordingly, while two paths 619 and 625 are shown in FIG. 6 in connection with corrective actions, this is merely exemplary, and more or less constructs for corrective action are contemplated. For example, corrective action may be taken based at least on the available wear parameters and, in some implementations based on other inputs or variables as described.

The operations described above in connection with FIG. 6 may be performed in a loop that is continuous during operation of vehicle 104.

Although various examples are described herein in which life management systems and methods are used for vehicle component life management, this is merely illustrative and it should be appreciated that the life management systems and methods described herein may be applied to systems and components other than vehicle systems as described herein.

In accordance with some aspects of the disclosure, a vehicle is disclosed that includes: a vehicle control system having processor circuitry, a system memory, and a system communications interface; and a vehicle component, the vehicle component having a component memory and a component communications interface that is communicatively coupled with the system communications interface, where the component memory is configured to store an accumulated wear parameter value for the vehicle component and an operating age that is indicative of a duration of use of the vehicle component, where the system memory stores instructions that, when executed by the processor circuitry of the vehicle control system, cause the vehicle control system to: obtain the accumulated wear parameter value and the operating age from the component memory of the vehicle component; update, during operation of the vehicle component, the accumulated wear parameter value based on a signal from the sensor; advance the operating age during operation of the vehicle component; determine, during operation of the vehicle component, an available wear parameter value for the vehicle component based on the accumulated wear parameter value and the operating age; and perform a first corrective action for the vehicle based on at least the available wear parameter value.

In accordance with other aspects, the instructions, when executed by the processor circuitry of the vehicle control system, further cause the vehicle control system to: monitor an operating condition of the vehicle component over a plurality of operating ranges; update, during operation of the vehicle component, a plurality of accumulated wear parameter values, each of the plurality of accumulated wear parameter values corresponding to a respective operating range of the plurality of operating ranges; and determine, during operation of the vehicle component, a plurality of available wear parameter values based on the plurality of accumulated wear parameter values and the operating age, each of the plurality of available wear parameter values corresponding to a respective operating range of the plurality of operating ranges, where the first corrective action for the vehicle is performed when at least one of the plurality of available wear parameter values falls below a respective first threshold for the corresponding operating range.

In accordance with other aspects, the instructions, when executed by the processor circuitry of the vehicle control system, cause the vehicle control system to determine the plurality of available wear parameter values by further causing the vehicle control system to: determine a projected wear parameter value for each of the plurality of operating ranges based on the advanced operating age and a respective growth rate; and update the available wear parameter values for the plurality of operating ranges based on differences between respective projected wear parameter values and respective accumulated wear parameter values corresponding to the plurality of operating ranges.

In accordance with other aspects, the vehicle component is a wheel, the operating condition includes an amount of torque applied to the wheel, each of the plurality of operating ranges includes a range of torque values, and the plurality of available wear parameter values includes numbers of available revolutions of the wheel.

In accordance with other aspects, the first corrective action includes operating the vehicle control system to limit an available amount of torque for application to the wheel.

In accordance with other aspects, the vehicle further includes a sensor for the vehicle component, the vehicle component includes an electronic switching device, the instructions, when executed by the processor circuitry of the vehicle control system, cause the vehicle control system to update the accumulated wear parameter value based on a signal from the sensor, the sensor includes a thermistor, the operating condition includes a temperature of the electronic switching device, and each of the plurality of operating ranges includes a temperature excursion range, and the plurality of available wear parameter values includes numbers of available thermal cycles of the electronic switching device.

In accordance with other aspects, the vehicle component includes an alternator, the operating condition includes a pole bolt speed and each of the plurality of operating ranges includes a range of pole bolt speeds, and the plurality of available wear parameter values includes numbers of available pole bolt speed cycles of the alternator.

In accordance with other aspects, the vehicle further includes an operator interface, the instructions, when executed by the processor circuitry of the vehicle control system, further cause the vehicle control system to perform the first corrective action for the vehicle based on at least the available wear parameter value when the available wear parameter value falls below a first threshold, and the first corrective action includes providing an alert via the operator interface.

In accordance with other aspects, the instructions, when executed by the processor circuitry of the vehicle control system, further cause the vehicle control system to perform a second corrective action of limiting operation of the vehicle when the available wear parameter value falls below a second threshold.

In accordance with other aspects, the vehicle further includes a plurality of vehicle components, each vehicle component having a respective component memory and a respective component communications interface that is communicatively coupled with the system communications interface of the vehicle control system, where the respective component memories of the plurality of vehicle components are configured to store respective accumulated wear parameter values for the corresponding vehicle components and respective operating ages that are indicative of durations of use of the corresponding vehicle components, and where the instructions, when executed by the processor circuitry of the vehicle control system, further cause the vehicle control system to: obtain the accumulated wear parameter values and the operating ages from the respective component memories of the plurality of vehicle components; update, during operation of the plurality of vehicle components, the respective accumulated wear parameter values for the plurality of vehicle components; determine, during operation of the plurality of vehicle components, respective available wear parameter values for the plurality of vehicle components based on the respective accumulated wear parameter values and the respective operating ages of the plurality of vehicle components; and perform the first corrective action for the vehicle when at least one of the available wear parameter values for the plurality of vehicle components falls below a respective threshold.

In accordance with other aspects, the vehicle further includes a plurality of sensors for the plurality of vehicle components, respectively, where the accumulated wear parameter values for the plurality of vehicle components are updated based on respective signals from the plurality of sensors.

In accordance with other aspects, the instructions, when executed by the processor circuitry of the vehicle control system, further cause the vehicle control system to store the accumulated wear parameter value and the operating age in the component memory of the vehicle component via the system communications interface at predetermined intervals.

In accordance with other aspects, the instructions, when executed by the processor circuitry of the vehicle control system, cause the vehicle control system to update the accumulated wear parameter value based on a signal from a sensor for the vehicle component or based on a model for an operating condition of the vehicle component.

In accordance with other aspects, the instructions, when executed by the processor circuitry of the vehicle control system, cause the vehicle control system to apply a life acceleration factor or a life deceleration factor to the available wear parameter value based on an environmental condition for the vehicle component.

In accordance with other aspects, the vehicle further includes an operator interface, the instructions, when executed by the processor circuitry of the vehicle control system, further cause the vehicle control system to perform the first corrective action for the vehicle based on at least the available wear parameter value when the available wear parameter value rises above an upper threshold, and the first corrective action includes providing an alert via the operator interface.

In accordance with other aspects, the instructions, when executed by the processor circuitry of the vehicle control system, further cause the vehicle control system to perform a second corrective action of reducing a cooling operation of the vehicle when the available wear parameter value rises above the upper threshold.

In accordance with some aspects, a vehicle control system is disclosed that includes: processor circuitry; and a system memory storing instructions that, when executed by the processor circuitry, cause the processor circuitry to: obtain a plurality of accumulated wear parameter values for a plurality of operating ranges, respectively, for a vehicle component of a vehicle and an operating age that is indicative of a duration of use of the vehicle component; monitor an operating condition of the vehicle component over the plurality of operating ranges; update the plurality of accumulated wear parameter values for the plurality of operating ranges, respectively, based on the monitored operating condition; advance the operating age based on operation of the vehicle component; determine an available wear parameter value for the vehicle component for each of the plurality of operating ranges based on the plurality of accumulated wear parameter values and the operating age of the vehicle component; and perform a corrective action for the vehicle when the available wear parameter value for at least one of the operating ranges falls below a respective threshold.

In accordance with other aspects, the instructions, when executed by the processor circuitry, cause the processor circuitry to determine the available wear parameter values by further causing the processor circuitry to: determine a projected wear parameter value for each of the plurality of operating ranges based on the advanced operating age and a respective growth rate; and subtract the accumulated wear parameter values for the plurality of operating ranges from the projected wear parameter values for the plurality of operating ranges, respectively.

In accordance with other aspects, the growth rate for a first one of the plurality of operating ranges is different from the growth rate for a second one of the plurality of operating ranges.

In accordance with other aspects, the vehicle control system further includes an operator interface, where the instructions, when executed by the processor circuitry, cause the processor circuitry to perform the corrective action by providing an alert to the operator interface or by limiting operation of the vehicle.

In accordance with other aspects, the instructions, when executed by the processor circuitry, further cause the processor circuitry to store the plurality of accumulated wear parameter values and the operating age in a component memory of the vehicle component at predetermined intervals.

In accordance with other aspects, the vehicle control system further includes a system communications interface, where the plurality of accumulated wear parameter values and the operating age are stored in the component memory via the system communications interface.

In accordance with some aspects, a computer-implemented method is disclosed that includes: obtaining an accumulated wear parameter value for a vehicle component of a vehicle and an operating age that is indicative of a duration of use of vehicle component; updating the accumulated wear parameter value based on operation of the vehicle component; advancing the operating age based on operation of the vehicle component; determining an available wear parameter value for the vehicle component based on the accumulated wear parameter value and the operating age; and performing a first corrective action for the vehicle when the available wear parameter value falls below a first threshold.

In accordance with other aspects, determining the available wear parameter value includes: determining a projected wear parameter value for the vehicle component based on the advanced operating age and a growth rate; and updating the available wear parameter value by subtracting the accumulated wear parameter value from the projected wear parameter value.

In accordance with other aspects, determining the projected wear parameter value includes adding an initialization value to a result of multiplying the advanced operating age and the growth rate.

In accordance with other aspects, the method further includes performing a second corrective action for the vehicle when the available wear parameter value drops below a second threshold.

In accordance with other aspects, the method further includes: monitoring operation of the vehicle component over a plurality of operating ranges; and obtaining a plurality of accumulated wear parameter values corresponding to the plurality of operating ranges, respectively; updating the plurality of accumulated wear parameter values based on the monitored operation of the vehicle component; and determining an available wear parameter value for each of the plurality of operating ranges based on the plurality of accumulated wear parameter values and the operating age, where the first corrective action is performed when at least one of the available wear parameter values drops below a respective first threshold for the corresponding operating range.

In accordance with other aspects, determining the available wear parameter value for each of the plurality of operating ranges includes: determining a projected wear parameter value for each of the plurality of operating ranges based on the operating age and a respective growth rate; and subtracting the accumulated wear parameter value for the respective operating range from the projected wear parameter value for the respective operating range.

In accordance with other aspects, the growth rate for a first one of the operating ranges is different from the growth rate for a second one of the operating ranges.

In accordance with other aspects, the method further includes performing a second corrective action for the vehicle when at least one of the available wear parameter values drops below a respective second threshold for the corresponding operating range.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages or pre-rendered web pages to a web browser on a user's client device in response to requests received from the web browser.

Various aspects of the subject matter described in this specification can be implemented in a computing system that includes a back end component, such as a data server, or that includes a middleware component, such as an application server, or that includes a front end component, such as a client computer having a graphical user interface or a Web browser through which a user can interact with an implementation of the subject matter described in this specification, or any combination of one or more such back end, middleware, or front end components. The components of the system can be interconnected by any form or medium of digital data communication, such as a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data to a client device (e.g., for purposes of displaying data to and receiving user input from a user interacting with the client device). Data generated at the client device (e.g., a result of the user interaction) can be received from the client device at the server.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or design.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A vehicle comprising:
   a vehicle control system that includes processor circuitry, a system memory, and a system communications interface; and
   a vehicle component, having a component memory and a component communications interface communicatively coupled with the system communications interface, wherein the component memory is configured to store a plurality of different accumulated wear parameter values for the vehicle component and an operating age that is indicative of a duration of use of the vehicle component, each of the accumulated wear parameter values representing an amount of accumulated wear of the vehicle component while the vehicle component operates in a respective operating range of a plurality of different operating ranges, wherein the system memory stores instructions that, while executed by the processor circuitry of the vehicle control system, direct the vehicle control system to:

update the accumulated wear parameter value for one or more of the different operating ranges and the operating age of the vehicle component during operation of the vehicle component;

determine projected wear parameter values of the vehicle component for the operating ranges, the projected wear parameter value determined for each of the operating ranges based on the operating age of the vehicle component that is updated and a designated growth rate of wear for the vehicle component that is associated with the respective operating range;

determine available wear parameter values for the vehicle component for each of the operating ranges based on the accumulated wear parameter value of the respective operating range and the projected wear parameter value of the respective operating range; and perform a first corrective action for the vehicle based on at least one of the available wear parameter values, wherein the vehicle component comprises an alternator;

wherein each of the plurality of operating ranges comprises a range of pole bolt speeds, and wherein each of the available wear parameter values comprises a number of available pole bolt speed cycles of the alternator.

2. The vehicle of claim 1, wherein
the first corrective action for the vehicle is performed responsive to at least one of the plurality of available wear parameter values falling below a respective first threshold for the corresponding operating range.

3. The vehicle of claim 1, wherein
the projected wear parameter value is determined for each of the plurality of operating ranges based on the operating age that is updated and a respective, different growth rate of the growth rates.

4. The vehicle of claim 1, further comprising a thermistor configured to measure a temperature of the vehicle component
that includes an electronic switching device,
wherein the instructions, while executed by the processor circuitry of the vehicle control system, direct the vehicle control system to update one or more of the accumulated wear parameter values based on a signal from the sensor,
wherein each of the plurality of operating ranges comprises a temperature excursion range, and
wherein each of the available wear parameter values comprises a number of available thermal cycles of the electronic switching device.

5. The vehicle of claim 1, further comprising an operator interface,
wherein the instructions, while executed by the processor circuitry of the vehicle control system, further direct the vehicle control system to perform the first corrective action for the vehicle based on at least one of the available wear parameter values responsive to the at least one available wear parameter value falling below a first threshold, and
wherein the first corrective action comprises providing an alert via the operator interface.

6. The vehicle of claim 5, wherein the instructions, while executed by the processor circuitry of the vehicle control system, further direct the vehicle control system to perform a second corrective action of limiting operation of the vehicle responsive to at least one of the available wear parameter values falling below a second threshold.

7. The vehicle of claim 1, further comprising a plurality of additional vehicle components, each of the additional vehicle components having a respective component memory and a respective component communications interface that is communicatively coupled with the system communications interface of the vehicle control system, wherein the respective component memories of the plurality of additional vehicle components are configured to store respective accumulated wear parameter values for the corresponding additional vehicle components and respective operating ages that are indicative of durations of use of the corresponding additional vehicle components, and wherein the instructions, while executed by the processor circuitry of the vehicle control system, further direct the vehicle control system to:

obtain the accumulated wear parameter values and the operating ages from the respective component memories of the plurality of additional vehicle components;

update, during operation of the plurality of additional vehicle components, the respective accumulated wear parameter values for the plurality of additional vehicle components;

determine, during operation of the plurality of additional vehicle components, respective available wear parameter values for the plurality of additional vehicle components based on the respective accumulated wear parameter values and the respective operating ages of the plurality of additional vehicle components; and perform the first corrective action for the vehicle responsive to at least one of the available wear parameter values for the plurality of vehicle components falling below a respective threshold.

8. The vehicle of claim 7, further comprising a plurality of sensors for the plurality of additional vehicle components, respectively,
wherein the accumulated wear parameter values for the plurality of additional vehicle components are updated based on respective signals from the plurality of sensors.

9. The vehicle of claim 1, wherein the instructions, while executed by the processor circuitry of the vehicle control system, further direct the vehicle control system to store the accumulated wear parameter values and the operating age in the component memory of the vehicle component via the system communications interface at predetermined intervals.

10. The vehicle of claim 1, wherein the instructions, while executed by the processor circuitry of the vehicle control system, direct the vehicle control system to update the accumulated wear parameter values based on one or more of a signal from a sensor for the vehicle component or a model for an operating condition of the vehicle component.

11. The vehicle of claim 1, wherein the instructions, while executed by the processor circuitry of the vehicle control system, direct the vehicle control system to apply a life acceleration factor or a life deceleration factor to at least one of the available wear parameter values based on an environmental condition for the vehicle component, wherein application of the life acceleration factor or the life deceleration factor increases or reduces the at least one available wear parameter value for the operating age of the vehicle component.

12. The vehicle of claim 1, further comprising an operator interface,
wherein the instructions, while executed by the processor circuitry of the vehicle control system, further direct the vehicle control system to perform the first corrective action for the vehicle based on at least one of the available wear parameter values responsive to the at least one available wear parameter value rising above an upper threshold, and
wherein the first corrective action comprises providing an alert via the operator interface.

13. The vehicle of claim 12, wherein the instructions, while executed by the processor circuitry of the vehicle control system, further direct the vehicle control system to perform a second corrective action of reducing a cooling operation of the vehicle responsive to at least one of the available wear parameter values rising above the upper threshold.

14. A vehicle control system, comprising:
processor circuitry; and
a system memory storing instructions that, while executed by the processor circuitry, direct the processor circuitry to:
obtain a plurality of accumulated wear parameter values for a plurality of operating ranges, respectively, for a vehicle component of a vehicle and an operating age that is indicative of a duration of use of the vehicle component;
monitor an operating condition of the vehicle component over the plurality of operating ranges;
update the plurality of accumulated wear parameter values for the plurality of operating ranges, respectively, based on the monitored operating condition;
advance the operating age based on operation of the vehicle component;
determine a plurality of projected wear parameter values for the plurality of operating ranges, respectively, for the based on the operating age of the vehicle component and a plurality of designated growth rates of wear of the vehicle component, wherein each of the operating ranges is associated with a different growth rate of the plurality of designated growth rates;
determine an available wear parameter value for the vehicle component for each of the plurality of operating ranges based on the plurality of accumulated wear parameter values and the projected wear parameter value of the vehicle component for the respective operating range; and
perform a corrective action for the vehicle when the available wear parameter value for at least one of the operating ranges falls below a respective threshold,
wherein the vehicle component comprises an alternator,
wherein each of the plurality of operating ranges comprises a range of pole bolt speeds, and
wherein each of the available wear parameter values comprises a number of available pole bolt speed cycles of the alternator.

15. The vehicle control system of claim 14, wherein the instructions, while executed by the processor circuitry, direct the processor circuitry to determine the available wear parameter values by further directing the processor circuitry to:
determine the projected wear parameter values by subtracting the accumulated wear parameter values for the plurality of operating ranges from the projected wear parameter values for the plurality of operating ranges, respectively.

16. The vehicle control system of claim 15, wherein the growth rate for a first one of the plurality of operating ranges is different from the growth rate for a second one of the plurality of operating ranges.

17. The vehicle control system of claim 14, further comprising an operator interface,
wherein the instructions, while executed by the processor circuitry, direct the processor circuitry to perform the corrective action by one or more of providing an alert to the operator interface or limiting operation of the vehicle.

18. The vehicle control system of claim 14, wherein the instructions, while executed by the processor circuitry, further direct the processor circuitry to store the plurality of accumulated wear parameter values and the operating age in a component memory of the vehicle component at predetermined intervals.

19. The vehicle control system of claim 18, further comprising a system communications interface, wherein the plurality of accumulated wear parameter values and the operating age are stored in the component memory via the system communications interface.

* * * * *